March 21, 1961 B. F. PALMER 2,976,102
DISTANCE AND SPEED RECORDING DEVICE
Filed April 22, 1957 2 Sheets-Sheet 1

INVENTOR.
Benjamin F. Palmer
BY
ATTORNEY.

March 21, 1961  B. F. PALMER  2,976,102
DISTANCE AND SPEED RECORDING DEVICE
Filed April 22, 1957  2 Sheets-Sheet 2

INVENTOR.
Benjamin F. Palmer
BY Thos. E. Scofield
ATTORNEY.

United States Patent Office 2,976,102
Patented Mar. 21, 1961

2,976,102
DISTANCE AND SPEED RECORDING DEVICE
Benjamin F. Palmer, Surrey Court Apts., 520 W. 12th St., Kansas City, Mo.
Filed Apr. 22, 1957, Ser. No. 654,092
1 Claim. (Cl. 346—18)

This invention relates to devices for recording speed and distance for use in power-operated, wheeled vehicles and refers more particularly to such devices which are connected to and driven by the speedometer cable of such vehicles.

A great need and demand both in the transportation and vehicle industries exists for a device which will record accurately, simultaneously and continuously both the speed and distance traveled by a vehicle, automobile or truck over varying periods of time. Many devices have been previously provided by the art for this purpose but all to date have fallen short in a number of required characteristics or abilities. A dependable such device would be of inestimable value not only to the transportation industries and companies but also in the individual, noncommercial transport field. Records of speed and mileage would not only enable transportation companies to maintain a strict supervision over the movement and activities of their vehicles, but also afford an independent objective check of personal vehicle movement extremely useful in case of accident or other need for accurate distance and/or speed recordings. In the former case, violation of area and company speed laws, traffic rules and travel plans not only cause greater and unnecessary wear on the conveyances, but also increase accidents, require expensive supervision and raise insurance rates. The instant device, in providing accurate, dependable, inexpensive recording of both distance and velocity (simultaneously) fulfills a great many both general and specialized needs which are hereinafter stated as objects of the invention.

An object of the invention is to provide an accurate, dependable, inexpensive, relatively simple and easy to manufacture device for simultaneously recording the velocity and distance traveled by wheeled vehicles.

Another object of the invention is to provide such a device wherein the velocity and distance traveled are simultaneously recorded on a tape which moves within the device at a velocity commensurate with the velocity of the vehicle in which the recording device is mounted.

Another object of the invention is to provide such a tape-employing speed and distance recording device wherein the tape capacity is substantially as great as may be desired whereby few changes or rechargings thereof are required and long distances may be traveled without the operator necessarily checking or changing the tape while yet maintaining an accurate record.

Another object of the invention is to provide such a tap recording device wherein the tape can be changed not only swiftly and easily, but also while the device is in use, without damage to the device itself in any way and with a minimum of interruption of the record being made.

Another object of the invention is to provide such a speed and distance recording device which will register any stops made by the vehicle, a feature not provided by conventional devices for the same purpose.

Another object of the invention is to provide such a distance and speed recording device which accurately records this data at all velocities of the vehicle in which the device is mounted, including both transient and sustained low velocities, as well as any high speed changes in velocity.

Another object of the invention is to provide such a recording device which requires no source of power or drive other than a connection to the speedometer cable of the conveyance.

Another object of the invention is to provide such a recording device which requires a minimum of maintenance, repair or upkeep due to its ruggedness and simplicity of construction and operation.

Yet another object of the invention is to provide a recording device for speed and velocity which produces a clear, accurate record on a continuous tape, such a record making it possible to compare like tapes over like routes whereby to maintain a completely accurate check on the movement of a vehicle over a given route.

Yet another object of the invention is to provide such a recording device for speed and distance which will clearly indicate the driving pattern and the tactics of a given vehicle operator whereby to more accurately allocate responsibility in case of accident, negligence or the like, such record thus raising the safety standards for a vehicle as the driver becomes aware of his responsibility.

Yet another object of the invention is to provide such a speed and distance recording device which will record all stops, authorized or not, on a given route and, in addition, show any attempts by a vehicle operator to make up speed by surpassing a previously designated maximum velocity.

Yet another object of the invention is to provide such a recording device with an extremely long operating life, so constructed that the parts thereof have a minimum of wear.

Yet another object of the invention is to provide such a device which will continue to make an accurate, continuous record of speed and distance traveled despite various motions and jars to the vehicle itself while avoiding injury to the various parts of the device by the construction, interaction and resilience of the component parts thereof.

Yet another object of the invention is to provide such a recording device for speed and distance traveled wherein a continuous tape records the said information and wherein said tape is mounted in a magazine which is insertable and removable from the device as a unit thereby permitting high speed loading and unloading of the device to minimize the maintenance and service time thereof.

Yet another object of the invention is to provide such a recording device wherein all of the component parts are readily available and accessible for inspection, replacement or repair if necessary.

Other and further objects of the invention will appear in the course of the following description thereof.

In the drawings, which form a part of the instant specification and are to be read in conjunction therewith, an embodiment of the invention is shown and, in the various views, like numerals are employed to indicate like parts.

Figures 1, 2:
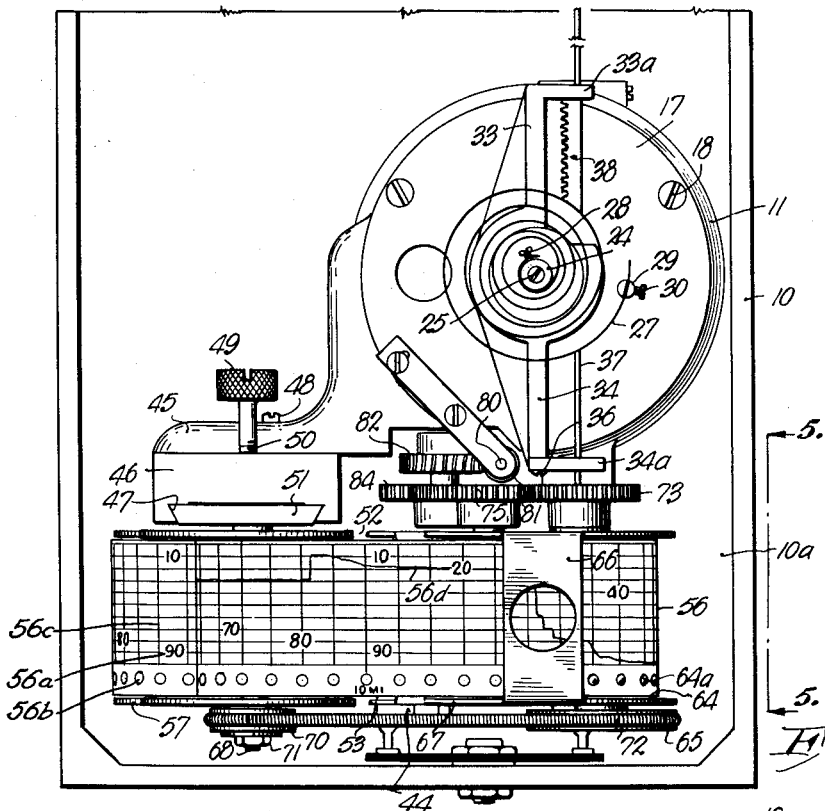
Fig. 1 is a rear view of the inventive speed and distance recording device.
Fig. 2 is a side view of the inventive speed and distance recording device looking downwardly from the top of Fig. 1.

Referring to the drawings, at 10 is shown the front portion of the housing for the inventive recording device which comprises a shallow rectangular box, preferably of aluminum or like metal. Housing 10 is adaptable to being fixed to the underside of a dashboard of an automobile or like wheeled vehicle. The front face 10a of the housing (that nearest the front end of the mounting conveyance) has an opening (not shown) therethrough to receive a take-off drive connection from the vehicle speedometer cable (also not shown). Magnet housing 11 is fixed to the rear side of the front face 10a of the housing 10 by screws extending through openings in the face 10a, welding or other conventional means. Magnet housing 11 has well 12 therein and a shaft orifice 13 extending from the bottom of the well out through the face thereof next the housing face 10a, matching the opening in the face 10a for receiving the speedometer drive engagement. A first shaft 14 is rotatably positioned within shaft orifice 13 and extends therethrough and into the opening in the housing face 10a for engagement with the speedometer drive connection (not shown). Shaft 14 has worm gear 15 on one portion thereof within the well 12 of the magnet housing. Magnet 16, roughly circular in form, is fixed to the end of the shaft 14 in the well 12 for rotation therewith. Magnet 16 preferably has a plurality of poles 16a, in this instance, a preferred form, six poles.

Figure 6:
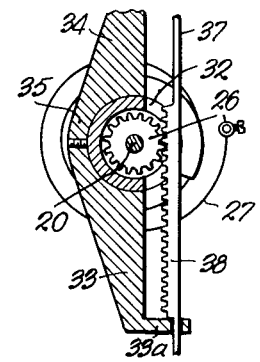
Fig. 6 is a view taken along the lines 6—6 of Fig. 2 in the direction of the arrows.

Magnet housing 11 has sealing lid 17 detachably fixable to the housing 11 by screws 18. Lesser diameter portion 19 (Fig. 2) of lid 17 extends downwardly within the well to furnish a tight seal. A second shaft 20 extends through an opening 21 in the magnet housing top 17 and rotatably mounted therein. An induction pickup hood 22, open at its free end, is fixed to the shaft 20 at its forward end by mount 23 which is rigidly seized to the shaft 20. The induction hood 22 has a greater internal diameter than the outer diameter of the multiple magnet and fits thereover whereby rotation of the magnet 16 tends to carry the induction hood 22 therewith, tending to thus rotate shaft 20. Induction hood 20 is made of metal susceptible to magnetic induction, such as copper. Mounted on the other end of shaft 20, extending rearwardly from the housing top 17, is spring mount 24. Spring mount 24 is fixed to the end of shaft 20 by screw 25, which threads into an opening in the end of shaft 20. Intermediate the ends of shaft 20, but above the magnet housing 17, a spur gear 26 (Fig. 6) is fixed to shaft 20 and rotates therewith.

Spiral spring 27 is engaged at its inner end by screw 28 threaded into the spring mounting 24 on the shaft 20, and at its other, outer end by slotted engagement 29 within which it is tightly fixed by screw 30, the slotted engagement 29 being supported relative the housing top 17 by shaft 31 which is fixed to the top 17. Spring 27 resists rotation of the shaft 20 with a force proportional to the actual displacement of the shaft 20 around its axis. Thus, a greater force is required to further displace the shaft 20 as it is displaced from a base position, to be later described. An enclosure 32 (Fig. 2) either formed integral with the top 17 or rigidly fixed thereto by welding or other conventional means, substantially surrounds the spur gear 26 and receives the upper end of the shaft 20 in rotatable fashion below the spring mount 24. Enclosure 32 is slotted to give access to gear 26. A rack mount, best seen in Fig. 1, has arms 33 and 34 and hollow circular engaging central portion 35 which fits down around the bearing hood 32 in tight engaging fashion. The face of the rack mount overlying the slotted bearing mount 32 is also cut away for access to gear 26. Mounting flanges 33a and 34a are fixed to the arms 33 and 34, respectively, the arm 34a being removably mounted relative arm 34 by screw 36. Shaft 37 extends through openings in the mounting flanges 33a and 34a and is slidable relative thereto. Rack 38 is rigidly attached to arm 37 and the teeth thereof engage the spur gear 26 whereby rotation of shaft 20 moves rack 38 and arm 37 back and forth relative the magnet housing 11. The rack 38 is of only slightly lesser thickness than the thickness of the slot in the bearing mount 32 whereby the rack 38 and the arm 37 will not turn around their axes.

Figure 3:
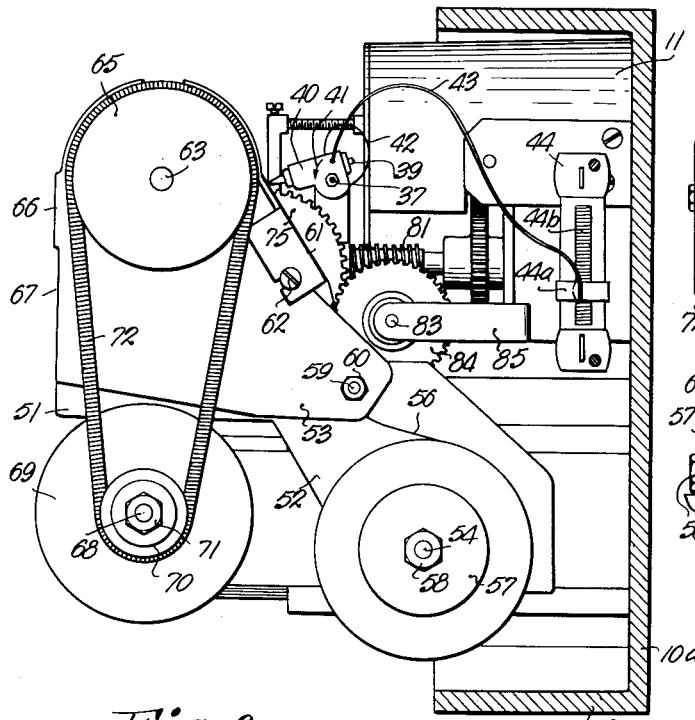
Fig. 3 is a second side view of the inventive distance and speed recording device of Fig. 1 from a direction opposite to that of Fig. 2 (looking up from the bottom of Fig. 1).

Fixed to the end of arm 37 next mounting flange 34a is stylus 39 having insulated heating coil 40 wrapped around the base thereof. Stylus 39 is resiliently mounted relative shaft 37 with a spring (not shown) tending to rotate the stylus and heating coil 40 in the direction shown by the arrow 41 of Fig. 3. Wire 42 leads from the heating coil to ground while wire 43 leads to variable resistor 44 which is fixed to one of the side walls of the housing 10. Resistor 44 controls the amount of heating current to the heating coil 40 on the metal stylus 39 whereby to regulate the heating of the stylus just above the temperature required to mark the tape as to be described. Wire 43 is attached to adjustable slide 44a which is movable along the variable resistance grid 44b.

Referring now to Fig. 1, formed integral with or rigidly attached to the magnet housing 10 is tape control unit guide supporting arm 45. Tape control unit guide 46, having slot 47 formed in the free face thereof, is fixed to arm 45 by screws 48. Locking screw 49 having threaded portion 50 threads into a threaded opening extending through the guide 46 into the slot 47.

In Figs. 1 and 2 may be seen the tape control unit slide 51 which is so shaped in cross section as to slidably fit in slot 47 whereby to be removably insertable in said slot inside guide 46 to be locked in place by rotation of locking screw 49. Primary frame sheet 52 is welded or otherwise fixedly attached to the slide 51 and comprises a sheet of metal having various attachments of shafts, guide bars, etc., thereto, to be described. Secondary frame sheet 53 (Fig. 3) is spaced from yet connected to primary frame sheet 52 by some of the various shafts, various guide bars and pieces to be described. These sheets and connections comprise the tape control unit frame.

Shaft 54 (Fig. 3) is mounted on primary frame sheet 52. Feed roll 55 of heat sensitive tape 56 is removably mounted thereon, the free end of shaft 54 being threaded whereby to permit the engagement of threaded adjustable-tightness nut 57 and locking nut 58 thereon. These two nuts regulate the amount of force required to unreel the tape from the roll 55. Guide bar 59 (Fig. 3) extends between frame sheets 52 and 53, aids in spacing them one from the other and is locked relative sheet 53 by nut 60. The tape 56 passes under guide bar 59 and then up over table 61 which is adjustably attached relative sheet 53 by screw 62. When the tape control unit frame is in position relative the rest of the assembly with all of the gear meshing and ready to drive the tape past the stylus, the stylus bears against the tape and table 61. Shaft 63 extends between the two sheets 52 and 53 and has a large diameter feed roller 64 mounted thereon which has tape engaging studs 64a thereon. The feed studs 64a prevent slippage of the tape and provide for regular feed thereof. A one directional ratchet is mounted internally of roller 64 relative shaft 63 to avoid any back slippage of the tape. Pulley 65 is mounted on shaft 63 outside of sheet 53. Perforated guide 66 (Fig. 1) extends between, connects and spaces the sheets 52 and 53 one from the other past the roller 64. Coming out from under the perforated guide 66, the tape is supported by an inclined table 67 extending between the two sheets 52 and 53 up over which the tape rides. Shaft 68 mounts receiving reel 69 which receives the tape after marking and stores it. Pulley 70 is engaged with reel 69 to force its rotation and is locked on shaft 68 by nut 71. Belt 72 connects pulleys 65 and 70 whereby rotation of shaft 63 and pulley 65 rotates pulley 70 and reel 69 on shaft 68. Shaft 68 is fixedly attached to the slide 51 and is not connected to either of the sheets 52 and 53. Referring now to Fig. 2, spur gear 73 is mounted on the opposite end of shaft 63 from pulley 65. Short shaft 74 mounts spur gear 75 on sheet 52, gear 75 being engaged by gear 73. Rotation of gear 75 will rotate gear 73 in the opposite direction and thus rotate drum 64 as well as pulley 65, thus rotating pulley 70 and reel 69.

Figure 4:
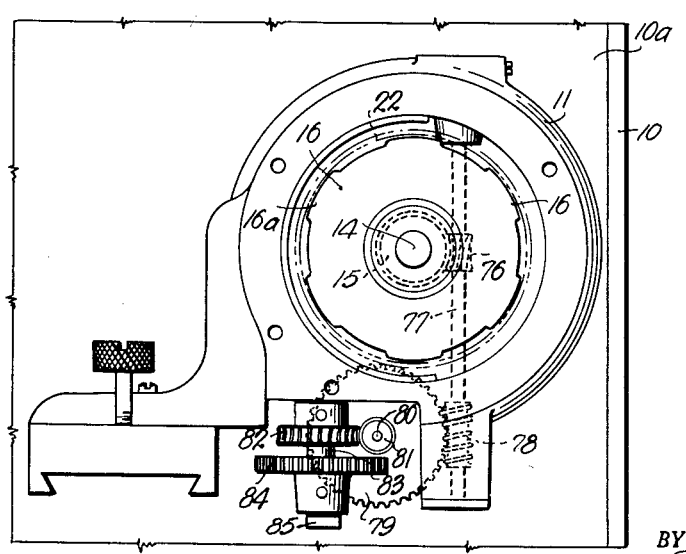
Fig. 4 is a rear view of a portion of the inventive recording device as shown in Fig. 1 but with parts thereof removed, namely, the tape control unit and the top of the magnet housing.

The drive gearing for driving spur gear 75 and thus the entire tape winding and unwinding mechanism will now be described. Referring back to Fig. 2 and worm gear 15 on shaft 14, gear 15 engages spur gear 76 mounted on shaft 77 (Fig. 4). Shaft 77 is journaled in the sides of the magnet housing 11 and rotates relative thereto. Worm gear 78 on shaft 77 engages and rotates spur gear 79, which is fixedly mounted on shaft 80, upon which is also fixedly mounted worm gear 81, above the spur gear 79. Worm gear 81 engages spur gear 82 which is mounted on shaft 83, which also mounts spur gear 84. Shaft 83 is rotatably journaled at one end in the magnet housing 11 and at the other end in a support arm 85. Shaft 80 is journaled rotatably at its lower end in a platform fixedly attached to the magnet housing 11. Spur gear 84 is engageable by the spur gear 75 when the slide 51 is inserted into slot 47 and moved downwardly therein. Thus, there is a continuous drive connection from the input power shaft 14 to the windup reel 69 mounted on shaft 68. It is, of course, evident that the gear ratios must be carefully calculated relative the spacings indicated on the tape 56 whereby the actual mileage input to the shaft 14 will be accurately represented by tape length moved past the marking stylus 39. It is obvious that the ratio of the various gears may be varied relative one another and that each gear ratio depends upon the other ones in the linkage. Therefore, no limiting set of values will be given.

Figure 5:
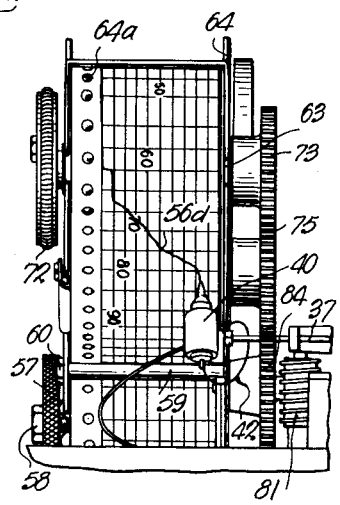
Fig. 5 is a view taken along the lines 5—5 of Fig. 1 in the direction of the arrows.

The character of the tape employed is readily seen in Figs. 1 and 5. The tape itself is a pressure and/or heat sensitive tape having a gridded surface, each longitudinal line representing ten miles an hour. Numerals 56a are spaced along the paper indicating the miles per hour the vehicle may be traveling. At the side of the tape are a series of perforations 56b engageable by the studs 64a on the drum 64. Distances are indicated by the spaced transverse lines 56c. One object of the previously described apparatus is to move a certain number of lines 56c past the marking stylus 39 per so many revolutions of the input shaft 14.

The tape 56 comprises a backing layer of dark surfaced or dark paper or other suitable material covered with a white surfacing material or film on which the grid markings and numerals are printed. Application of sufficient heat or pressure to the tape itself will remove or burn off the very thin paint-like top covering and reveal the ink below, thus making a continuous line mark as the stylus 39 moves along the tape. This line is shown at 56d in Figs. 1 and 5. A suitable tape has been found to be one manufactured by Ludlow Papers, Inc., Needham Heights, Massachusetts, the preferred type of tape being designated as G-54 chart paper. This paper is disclosed in Patent No. 2,299,991 to William Kallock, entitled "Chart Paper."

In operation, with the speedometer cable connected to shaft 14, and the slide 51 inserted in the slot 47 so that spur gear 75 engages spur gear 84, rotation of shaft 41 rotates both worm gear 15 and magnet 16. The chain of action caused by the rotation of the magnet will be taken up first. Rotation of magnet 16 tends to pick up and rotate, in the same direction, induction hood 22 and thus shaft 20. However, the spring 27 attached to the other end of the shaft 20 limits the rotation of shaft 20 proportional to the amount of torque applied through the hood 22. This torque is proportional to the velocity of rotation of magnet 16. It should be noted that shaft 20 must be mounted for extremely easy and relatively frictionless rotation relative the top 17 to permit pickup by hood 22 in the situation of relatively low speed rotation of magnet 16. The partial rotation of shaft 20 (and thus of gear 26 therewith) causes movement of the rack 38 and arm 37 from the base position shown in Fig. 1 with one end of the rack abutting the arm 33a. The base position of the stylus 39 must agree with the zero miles per hour line on the tape 56. Speeding up or slowing down of the vehicle will speed up or slow down rotation of shaft 14 and move the stylus on arm 37 back and forth transversely of the tape. The limit of motion of the arm 37 is established by the unseen end of the rack 38 abutting arm 34a in Fig. 1. This should coincide with the speed limit of the car or the limit of speed indicated on the other side of the tape.

Turning now to the drive for the tape mechanism, rotation of shaft 14 through the gears 15 and 76 rotates shaft 77, which through gears 78 and 79 causes rotation of shaft 80. Gears 81 and 82 cause the rotation of shaft 83 and spur gear 84 which in turn causes rotation of spur gear 75. Gear 75 causes rotation of shaft 63 from gear 73 and belt 72 on pulleys 65 and 70 causes rotation of reel 69, thus pulling the tape from the feed roll 55, with the aid of the studs 64a on the drum 64. Thus, both the motion of the tape and the motion of the stylus are controlled from the same power input through shaft 14 and are coordinated one with the other. The greater the speed the faster the motion of the tape and, as well, the greater displacement of the stylus from its base position adjacent the magnet housing. Thus, both speed and distance may be indicated on the device. The required heat of the stylus is regulated by motion of the slide 44a relative the variable resistance grid 44b.

From the foregoing it will be seen that the invention is adapted to attain all of the ends and objects hereinbefore set forth together with other advantages which are obvious and inherent to the apparatus described.

It will be understood that certain features and subcombinations are of utility and may be employed without reference to other features and subcombinations, this being contemplated by and within the scope of the claim.

As many possible embodiments may be made of the invention without departing from the scope thereof, it is to be understood that all matter hereinabove set forth is to be interpreted as illustrative and not in a limiting sense.

Having thus described my invention, I claim:

A speed and distance recording device for use in a vehicle having a cable-driven speedometer comprising a housing, a first shaft rotatably mounted on said housing, means for connecting the first shaft to the speedometer cable whereby rotation of the cable drives the first shaft in rotation therewith, a source of tape in continuous strip form rotatably mounted on said housing, means comprising a stylus for marking said tape strip with a continuous line mounted on said housing, means for moving said tape past said marking means, traversing means for the marking means operable to move said marking means back and forth across said tape between its lateral edges to and from a base position adjacent to one edge of said tape, a magnet carried on said first shaft for rotation therewith, a second shaft rotatably mounted on said housing axially in line with the first shaft, an induction pickup hood fixedly mounted on said second shaft and so positioned relative to said magnet that rotation of the said first shaft causes deflection of the second shaft proportional to the velocity of rotation of the first shaft, a positive mechanical drive connection between said traversing means and said second shaft whereby deflection of the second shaft, actuated by its magnetic coupling with the first shaft, traverses the marking means across the tape a distance proportional to the deflection of the second shaft, a positive mechanical drive connection from said first shaft to said tape moving means whereby rotation of the first shaft moves the tape past the marking means at a rate strictly commensurate to the rate of rotation of the first shaft, and resilient means attached to the second shaft tending to maintain the marking means adjacent said base position when the first shaft is not rotating and limiting the total possible deflection of the second shaft, the resistance of said resilient means increasing substantially uniformly in relation to the increase in deflection of the second shaft.

References Cited in the file of this patent

UNITED STATES PATENTS

| | | |
|---|---|---|
| 982,021 | Renfro | Jan. 17, 1911 |
| 1,458,451 | Wallbillich | June 12, 1923 |
| 1,753,923 | Felty | Apr. 8, 1930 |
| 2,109,109 | Finch | Feb. 22, 1938 |
| 2,169,230 | De Martile | Aug. 15, 1939 |
| 2,245,784 | James | June 17, 1941 |
| 2,341,118 | Rodanet | Feb. 8, 1944 |
| 2,664,335 | Gorham | Dec. 29, 1953 |
| 2,757,062 | Hood | July 31, 1956 |
| 2,798,174 | Helgeby | July 2, 1957 |